United States Patent
Chaponniere et al.

(10) Patent No.: US 10,506,607 B2
(45) Date of Patent: Dec. 10, 2019

(54) DISCOVERY OF MULTI-HOP CAPABILITIES AND ROUTING ON A PER LINK BASIS

(71) Applicant: QUALCOMM Incorporated, San Diego, CA (US)

(72) Inventors: Etienne Francois Chaponniere, San Diego, CA (US); John Edward Smee, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 14/664,575

(22) Filed: Mar. 20, 2015

(65) Prior Publication Data

US 2015/0350867 A1 Dec. 3, 2015

Related U.S. Application Data

(60) Provisional application No. 62/006,877, filed on Jun. 2, 2014.

(51) Int. Cl.
*H04W 72/04* (2009.01)
*H04W 8/00* (2009.01)
(Continued)

(52) U.S. Cl.
CPC ....... *H04W 72/0486* (2013.01); *H04W 8/005* (2013.01); *H04W 28/26* (2013.01);
(Continued)

(58) Field of Classification Search
CPC ............. H04W 72/04; H04W 72/0406; H04W 72/0486; H04W 72/02; H04W 88/04;
(Continued)

(56) References Cited

U.S. PATENT DOCUMENTS 8,279,842 B2 10/2012 Stewart
8,315,231 B2 11/2012 Pirzada et al.
(Continued)

FOREIGN PATENT DOCUMENTS

CN   101325560 A   12/2008
CN   101822003 A    9/2010
(Continued)

OTHER PUBLICATIONS

International Search Report and Written Opinion—PCT/US2015/026530—ISA/EPO—dated Jul. 1, 2015.
(Continued)

*Primary Examiner* — Ricardo H Castaneyra
(74) *Attorney, Agent, or Firm* — Loza & Loza, LLP

(57) ABSTRACT

A device and a method to send a resource discovery query to a local device to request per link resource information for a wireless link between a requesting device and the local device, to receive the requested per link resource information from the local device indicating resources the local device has available to allocate to the wireless link, and to establish the wireless link with the local device based on the resource information received are disclosed. The wireless link may be a point-to-point link, A device and method to allocate resources, from a set of resources available to the local device, on a per link basis, to receive a resource discovery query from a requesting device seeking per link resource information, and to send per link resource information to the requesting device indicating the resources the local device has available to allocate to the wireless link are disclosed.

56 Claims, 11 Drawing Sheets

(51) Int. Cl.
*H04W 40/24* (2009.01)
*H04W 28/26* (2009.01)
*H04W 40/04* (2009.01)
*H04W 84/18* (2009.01)

(52) U.S. Cl.
CPC ......... *H04W 40/04* (2013.01); *H04W 40/246* (2013.01); *H04W 84/18* (2013.01)

(58) Field of Classification Search
CPC ... H04W 88/02; H04W 28/26; H04W 40/246; H04W 40/04; H04W 8/005; H04W 84/18; H04W 24/04; H04W 84/047; H04W 40/22; H04W 72/00; H04W 28/14; H04W 72/12; H04W 72/0473; H04W 24/02; H04W 52/38; H04W 40/248; H04L 47/70; H04L 47/823; H04L 63/10
See application file for complete search history.

(56) References Cited

U.S. PATENT DOCUMENTS

| | | | |
|---|---|---|---|
| 8,619,756 B2 | 12/2013 | Das et al. | |
| 2002/0085526 A1* | 7/2002 | Belcea | H04W 40/08 370/337 |
| 2003/0012145 A1* | 1/2003 | Bragg | H04L 45/00 370/254 |
| 2004/0109428 A1* | 6/2004 | Krishnamurthy | H04L 47/14 370/338 |
| 2004/0174865 A1 | 9/2004 | O'Neill | |
| 2005/0198328 A1* | 9/2005 | Lee | H04L 45/02 709/229 |
| 2007/0081507 A1* | 4/2007 | Koo | H04B 7/15542 370/338 |
| 2008/0279167 A1* | 11/2008 | Cardei | H04W 28/26 370/342 |
| 2009/0161688 A1* | 6/2009 | Park | H04W 48/08 370/441 |
| 2009/0240449 A1* | 9/2009 | Gibala | G01R 22/063 702/62 |
| 2010/0103857 A1 | 4/2010 | Ulupinar et al. | |
| 2011/0292949 A1 | 12/2011 | Hayashi et al. | |
| 2014/0258415 A1* | 9/2014 | L'Heureux | H04L 67/1061 709/205 |
| 2015/0249971 A1* | 9/2015 | Yu | H04W 76/27 370/330 |

FOREIGN PATENT DOCUMENTS

| | | |
|---|---|---|
| CN | 101919180 A | 12/2010 |
| JP | 2005504484 A | 2/2005 |
| JP | 2012095235 A | 5/2012 |
| WO | WO-2007103026 A2 | 9/2007 |
| WO | WO-2009009511 A2 | 1/2009 |
| WO | 2011008975 | 1/2011 |
| WO | WO-2013109137 A1 | 7/2013 |
| WO | 2014075270 A1 | 5/2014 |

OTHER PUBLICATIONS

Liu F., "Context Discovery in Ad-hoc Networks," Wohrmann Print Service, Jun. 19, 2011, pp. 1-252.
Xiao L., et al., "Simultaneous Routing and Resource Allocation via Dual Decomposition," 2002, 6 pages.

* cited by examiner

DISCOVERY OF MULTI-HOP CAPABILITIES AND ROUTING ON A PER LINK BASIS

CROSS-REFERENCE TO RELATED APPLICATIONS

This application claims priority to and the benefit of U.S. provisional patent application No. 62/006,877 filed in the United States Patent And Trademark Office on Jun. 2, 2014, the entire content of which is incorporated herein by reference.

BACKGROUND

1. Field

Various features relate to communication devices and methods for discovery of device resources in multi-hop systems and routing of traffic through surrounding devices on a per link basis.

2. Background

In current wireless cellular communication systems such as those commonly referred to as 3G, 4G, and/or long term evolution (LTE) systems, wireless devices maintain a paradigm where communication between devices passes through an access node (e.g., base station, NodeB, or eNodeB). Under this paradigm, a wireless device establishes a single link with its access node (where the link includes uplink and downlink components).

In current wireless cellular communication systems, a device announces its radio access capability in terms of a "category." Devices announce their capability to other devices in order to facilitate communication between the devices. Separate categories are defined for uplink and the downlink.

Because the device establishes one link with its access node, the category of a given device is effectively provided on a per device basis. The category announced by a device, for the uplink and downlink, represents only a partial list of the total capabilities of that device. An example of a standard that establishes capability parameters on a per device basis may be found in 3GPP Technical Specification (TS) 36.306, which defines, on a per device basis (i.e., a per user equipment (UE) basis), eleven categories for uplink capability and a separate eleven categories for downlink capability. See 3GPP TS 36.306 version 12.2.0, Tables 4.1-1 and 4.1-2. The present approach provides for advertisement on a per device basis, but not on a per link basis. It is noted that the word "capabilities" as used herein is not intended to be limited to the capabilities identified in 3GPP TS 36.306 version 12.2.0, Tables 4.1-1 and 4.1-2.

Consequently, there is a need for a solution(s) that allows devices to allocate and announce capabilities and/or resources on a per link basis. For example, it would be desirable to provide a mechanism for devices to advertise capabilities for more than one link (e.g., in the event a device is able to establish a first link with an access node and a second link with another device). As another example, it would be desirable to provide a mechanism to advertise the resources that a given device has available to be used for establishing one link with one device. As yet another example, it would be desirable to provide a mechanism for determining how the resources of a given device would be allocated between two or more links on a per link basis. These resources can be, but are not limited to, memory resources, processing power resources, transmitter bandwidth resources, receiver bandwidth resources, number of transmit/receive antennas, and/or a combination of sets of resources.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A system of one or more computers, machines, and/or devices can be configured to perform particular operations or actions by virtue of having software, firmware, hardware, or a combination of them installed on a system that in operation causes or cause the system to perform the actions herein, the actions being described in an exemplary and non-limiting fashion. One or more computer programs can be configured to perform particular operations or actions by virtue of including instructions that, when executed by data processing apparatus, cause the apparatus to perform the actions. One general aspect may include a method operational at a requesting device, including: sending a resource discovery query to a local device requesting per link resource information available for a wireless link between the requesting device and the local device. The method may also include receiving per link resource information from the local device indicating resources the local device has allocated, or has available to allocate, to the wireless link. The method may also include establishing the wireless link with the local device based on the resource information received. Other examples of this aspect may include corresponding computer systems, apparatus, and computer programs recorded on one or more computer storage devices, each configured to perform the actions of the methods.

One general aspect may include a requesting device, including: a wireless network interface configured to communicate with one or more local devices; a processing circuit coupled to the wireless network interface, the processing circuit configured to: send a resource discovery query to a first local device requesting per link resource information available for a wireless link between the requesting device and the first local device. The requesting device may also receive per link resource information from the first local device indicating the resources the first local device has allocated, or has available to allocate, to the wireless link; and establish the wireless link with the first local device based on the resource information received. Other examples of this aspect may include corresponding computer systems, apparatus, and computer programs recorded on one or more computer storage devices, each configured to perform the actions of the methods.

One general aspect may include a method operational at a local device, including: allocating resources, from a set of resources available to the local device, on a per link basis. The method may also include receiving a resource discovery query from a requesting device seeking per link resource information available for a wireless link between the requesting device and the local device; and sending per link resource information to the requesting device indicating the resources the local device has allocated, or has available to allocate, to the wireless link. Other examples of this aspect may include corresponding computer systems, apparatus, and computer programs recorded on one or more computer storage devices, each configured to perform the actions of the methods.

One general aspect may include a local device, including a wireless network interface configured to communicate data traffic with one or more local devices; a processing circuit coupled to the wireless network interface, the processing circuit configured to: receive a resource discovery query from a requesting device seeking per link resource information available for a wireless link between the requesting device and the local device; allocate resources from a set of resources available to the local device on a per link basis; and send per link resource information to the requesting device indicating the resources the local device has allocated, or has available to allocate, to the wireless link. Other examples of this aspect may include corresponding computer systems, apparatus, and computer programs recorded on one or more computer storage devices, each configured to perform the actions of the methods.

These and other aspects of the disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
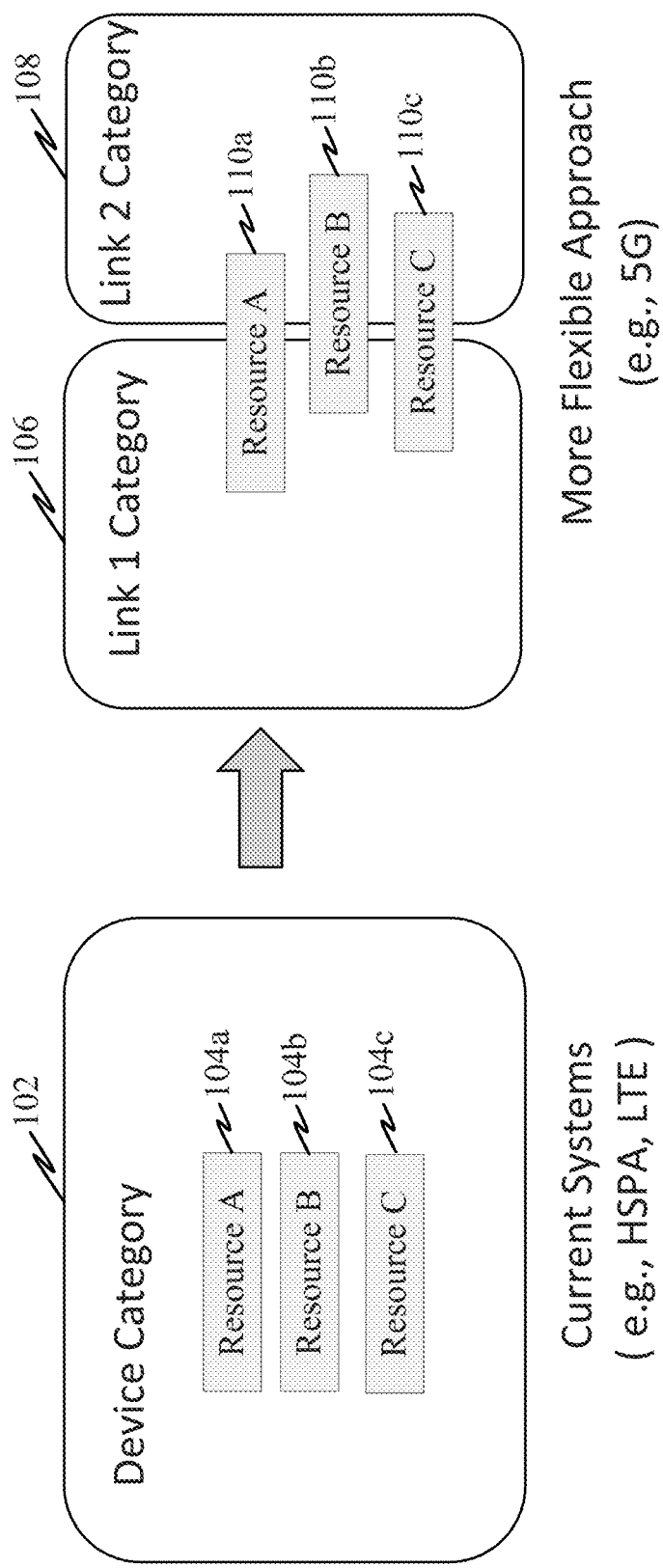
FIG. 1 is a block diagram illustrating different ways in which categories (e.g., a set of resources) may be defined.

In the following description, specific details are given to provide a thorough understanding of the embodiments. However, it will be understood by one of ordinary skill in the art that the embodiments may be practiced without these specific detail. For example, circuits may be shown in block diagrams in order avoid obscuring the embodiments in unnecessary detail. In other instances, well-known circuits, structures, and techniques may not be shown in detail in order not to obscure the embodiments.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage, or mode of operation.

Overview in a wireless communication system where a wireless mobile device (referred to herein as a "device" or "UE device" for exemplary and non-limiting purposes) may support different wireless links with different end-points simultaneously or nearly simultaneously, the notion of "category" may be dissociated from the capability of the device. Some or all of the capabilities and/or resources of a device, including but not limited to the parameters associated with the device, might be identified by disclosing the category of the device. However, rather than having a single "category" describe each device on a per device level, each wireless link supported by the device may be associated with its own category, thereby permitting the use of categories to describe each wireless link on a per link level. This also allows for dynamic alteration of resource allocation/reallocation for wireless links supported by the device. Each category may represent a different combination or allocation of resources available, on a per basis, at the device. A wireless link (also referred to herein as a link) may refer to a wireless connection between a transmitter and receiver. The wireless link may be a point-to-point link. Data traffic through an intermediary access node (e.g., eNodeB) may not be required.

In one example, for a forwarding link (e.g., a UE device serving as a hop device in a multi-hop network), a category for the forwarding link (associated with the receiving and transmitting entities) may represent the amount of resources the UE device has available to allocate to this forwarding link. Another link (e.g. a link terminating at the UE device) may have a different category depending on the service and subscription for the UE device. Consequently, the notion of "category" becomes an attribute of each wireless link rather than a single attribute of the UE device.

Two features disclosed herein include partitioning of categories and route discovery within the context of per wireless link (i.e., per link) device categories.

In category partitioning, a device (e.g., a UE device) may partition its resources in categories (i.e., sets of resources). In one example, the UE device may partition its resources into: (A) the amount of resources dedicated for its own traffic, and (B) the amount of resources dedicated to forwarding traffic, all on a per link basis. The categories may not only be determined by physical capabilities and/or resources of the UE device on a per link basis, but may also be determined by other factors such as: (A) subscription data plan (e.g. in the case of "sponsored connectivity"), and/or (B) user preference data.

In route discovery, the resources for all devices (e.g., including intermediary devices) across a multi-hop route, on a per link basis, may be discovered. Consequently, the discovery procedures may determine: (A) the set of devices (e.g., UE devices) to traverse to reach a destination device, (B) the resources available in the traversed devices, on a per link basis, along the route, which may include support for guaranteed bit rate types of services (e.g. voice, mission critical applications), and/or (C) the best route or routes to access the data or content sought. For instance, multiple routes may be useful for increased reliability (depending on application), larger aggregated bandwidth, etc. Additionally, when setting up a multi-hop route, discovery procedures may determine whether specific content is available on surrounding devices, thereby avoiding the need to obtain the content from a more distant device or location.

Exemplary Category Partitioning

FIG. 1 is a block diagram illustrating a difference between how a device category 102 is traditionally defined in existing systems on a per device basis, versus how categories may be defined using a more flexible approach on a per link basis 106, 108. In a traditional approach, a device category 102 may be understood to represent a set of resources. In the traditional approach, the device category 102 may be defined to represent a set of resources 104a, 104b, 104c, where the set of resources 104a, 104b, and 104c is specified or defined for the device (i.e., resources on a per device basis). By contrast, category partitioning may be done on a per link basis such that a portion of each resource 110a, 110b, and 110c may be allocated to each link 106 and 108. The set of resources allocated to a link can be specified or defined for each link established by the device (i.e., resources on a per link basis). Resources may be allocated equally or unequally. In the example of FIG. 1, a greater allocation of Resource A 110a is provided to Link 1 106 than to Link 2 108. A lesser allocation of Resource B 110b is provided to Link 1 106 than to Link 2 108. An equal allocation of Resource C 110c is provided to Link 1 106 and to Link 2 108. Consequently, the category becomes an attribute of the link rather than of the UE device. Note that a link may be a channel and/or a connection at the lowest layer of a protocol stack (e.g., the physical layer) between two devices or nodes (e.g., two UE devices).

The category for each link in an active wireless link may be updated when other links are created/modified/deleted, thus removing/adding resources available to each active link. For example, in the event that a new link is to be added (e.g., Link 3, not shown), the resources that are available for such a new link may be obtained from the resources (e.g., Resources A, B, and C) used to support operation of the pre-existing links (e.g., Link 1, Link 2). In this event, by way of example, Resource A might be reallocated in any proportion amongst Link 1, Link 2 and, to be established, Link 3. A similar reallocation may occur for Resources B and C. An initial allocation of, or a reallocation (e.g., an update) of, resources for a given link category 106, 108 may be realized by allowing the UE device to advertise its resources, and/or an amount of each resource available for allocation, on wireless links. The initial allocation or reallocation of resources may also be realized by allowing the UE device to initiate updates of the resource allocations on a per link basis. Various reporting schemes may apply such as: (A) control plane (CP) level update/ACK procedure (i.e., a radio resource control (RRC) level procedure), (B) medium access control (MAC) level update message (with or without acknowledgement ACK), and/or (C) all resources constituting the category can be reported or only a subset of resources may be reported.

The amount of resources allocated to each link may not only be dictated by the extent of the abilities of a UE device but also by user preferences (e.g., how much of a UE device's resources is a user willing to devote to forwarding packets from other users/devices in a multi-hop network) or subscription preferences (e.g., an operator could bring an aspect of "sponsored connectivity" if the UE device devotes some of its resources to forwarding data in a multi-hop network). In one example, resource allocation may be realized by allowing a control plane level configuration of the categories for the links of the UE device.

Figure 2:
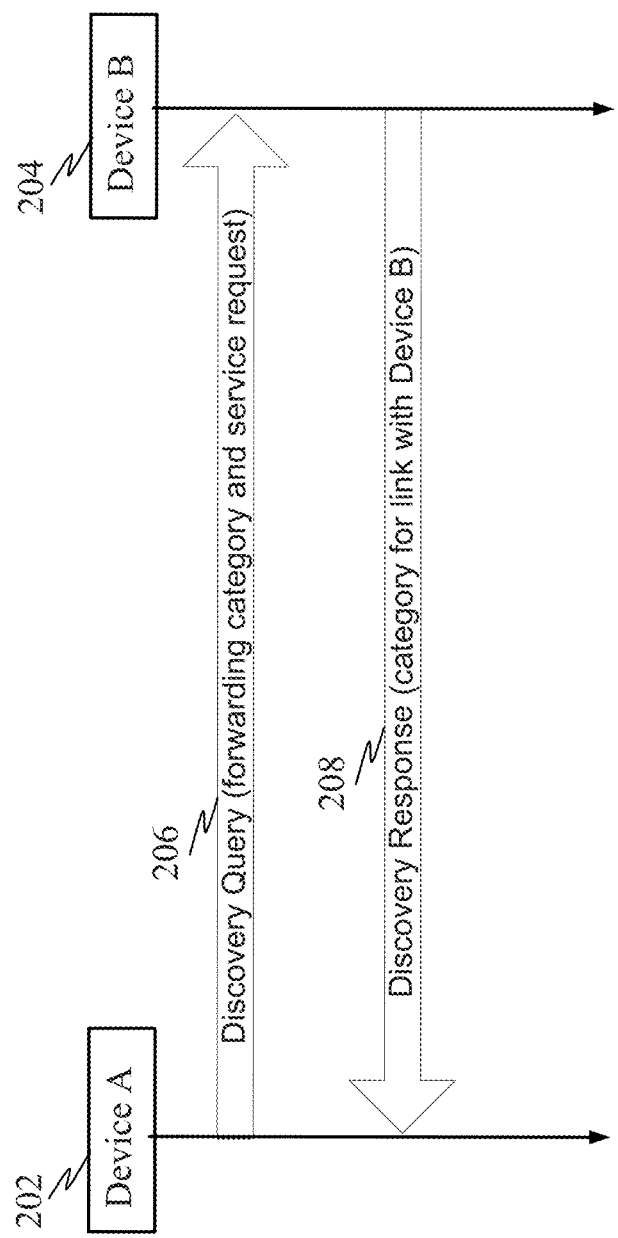
FIG. 2 illustrates an exemplary discovery procedure in which category information may be sent.

FIG. 2 illustrates an exemplary discovery procedure in which category information may be sent from one device to another. A first device A 202 (e.g., user equipment, wireless communication device, subscriber device, mobile device, sensor, connected machine, wireless phone) may employ a mechanism whereby it can query various attributes of surrounding devices. In a first example, the first device A 202 may send a discovery query 206 to a second device B 204. For example, one such attribute requested may be the forwarding category of the second device B 204, which represents the amount and/or types of resources the second device B 204 has available for forwarding traffic (i.e., traffic the second device B 204 may be willing/able to forward from device A to other devices (not shown)). The category may be a list, or set, of specific resources that can be shared with the requesting device (e.g., first device A 202). In some examples, each category in the list of categories, or set of categories, represents a plurality of resources that may be used, or that may be needed, for establishing a link, and may define an amount of each resource represented by the category. The link may be a point-to-point link. For example, such resources may include, but are not limited to, one or more of memory resources, processing power resources, transmitter bandwidth resources, receiver bandwidth resources, number of transmit/receive antennas, and/or a combination of specific sets of resources.

In another example, the first device A 202 may simply indicate a type of service it requires (e.g. best effort, time-sensitive, etc.) from the second device B 204.

In connection with either example (discovery query 206 or service type request), the second device B 204 may reply 208 by indicating its forwarding category and/or whether the service request can be granted.

Figure 3:
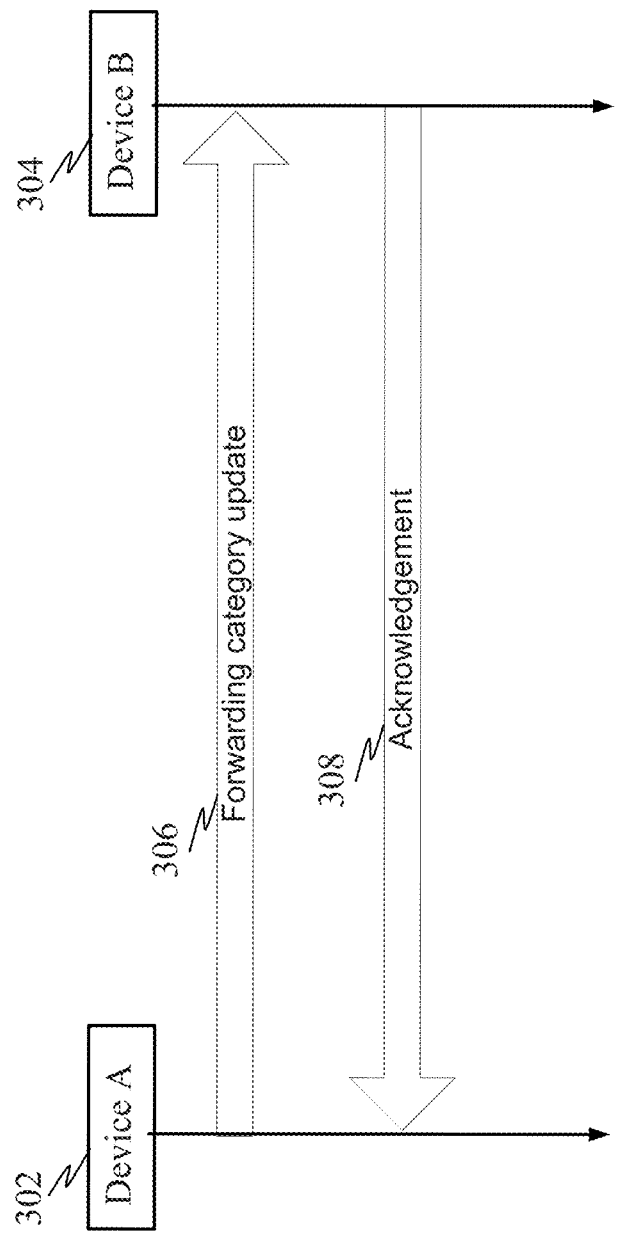
FIG. 3 illustrates an exemplary category update procedure in which a device may update other devices as its category has changed.

FIG. 3 illustrates an exemplary category update procedure in which a device may update other devices that its category has changed. For example, a first device A 302 may send a category update 306 to surrounding devices (e.g., second device B 304) that its forwarding category has changed. This category change and update may occur, for example, as the first device A 302 adds or removes links. The reasons for a category update by the first device A 302 may include: (A) the first device A 302 has become part of a multi-hop route, (B) another route has changed in intensity, (C) changes in resources devoted to first device A 302's own terminating traffic, and/or (D) changes in resources devoted to first device A 302's own originating traffic. This list is exemplary and non-limiting, as other reasons for a category update are within the scope of the disclosure.

To avoid generating too much signaling traffic, in one example, the first device A 302 may only send such category updates to surrounding devices with which the first device A 302 currently has an active link.

A second device B 304 that receives the category update 306, may then reply with an acknowledgement 308.

Exemplary Route Discovery

Figures 4, 5:
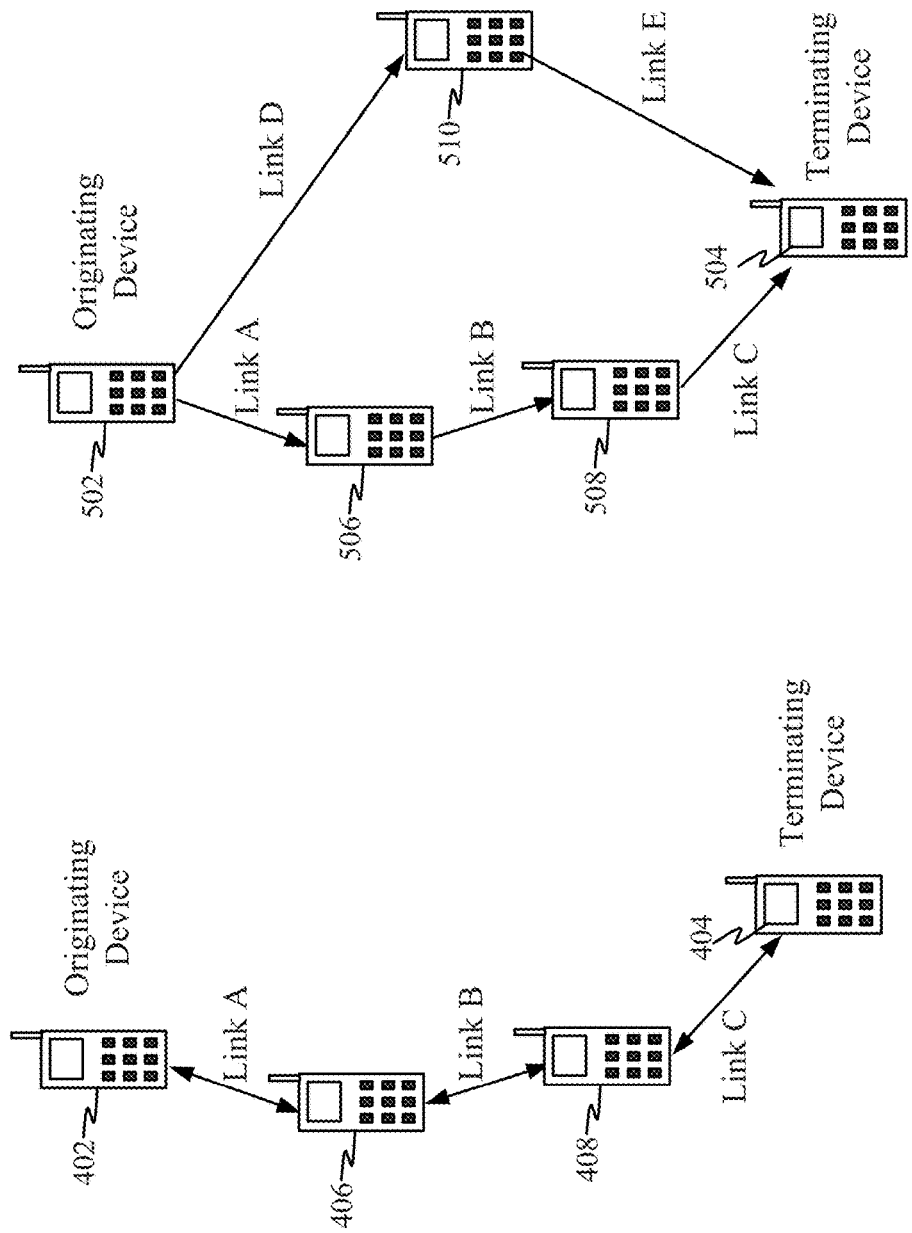
FIG. 4 illustrates routing in a multi-hop mode where there is a single route that is available between an originating device and a terminating device.
FIG. 5 illustrates routing in a multi-hop mode where there is an aggregated route between the originating device and the terminating device.

Routing discovery may refer to establishing a path through a network from an originating device and a terminating device. Oftentimes, such routing involves intermediary hop devices that forward communications between the originating and terminating devices. In accordance with one example, the originating, terminating, and intermediary hop devices may each be UE devices. In FIG. 4, the UE devices are illustrated as identical devices; however, this was for ease of illustration nothing described herein limits any set of devices to be identical. In order to determine an appropriate routing for a service desired at an originating device, the partitioning of resources (to each active wireless link) in each device in the route needs to be communicated.

FIG. 4 illustrates routing in a multi-hop mode where there is a single route that is available between an originating device 402 and a terminating device 404. The route may include one or more intermediary hop devices 406 and 408 between the originating device 402 and the terminating device 404. Links between two devices (e.g., Link A between devices 402 and 406) may be referred to as a link. The overall link from the originating device 402 to the terminating device 404 may be referred to as an end-to-end link. An end-to-end link may include one or more links. A link may originate at the requesting device (which may alternatively be referred to as an originating device in this scenario) and terminate at the local device or may originate at the local device and terminate at the originating device. Thus, data traffic may be transmitted to and/or received from a network access node. Links may include point-to-point links.

In the example of FIG. 4, where a single route is available, the "weakest link" principle may apply by which the resources for the weakest (i.e., least available or least capable) link between any two devices in the route determines the end-to-end link resources or performance between the originating device 402 and terminating device 404.

FIG. 5 illustrates routing in a multi-hop mode where there is an aggregated route between an originating device 502 and the terminating device 504. In this example, a first route may be available via links A-B-C using intermediary devices 506, 508, while a second route may be available via links D-E using another intermediary device 510. Thus, the first route (via a first set of intermediary devices 506 and 508) and the second route (via a second intermediary device 510) may be aggregated to allow communications between the originating device 502 and terminating device 504. Communication may occur over the first route, the second route, or both the first and second routes.

Figure 6:
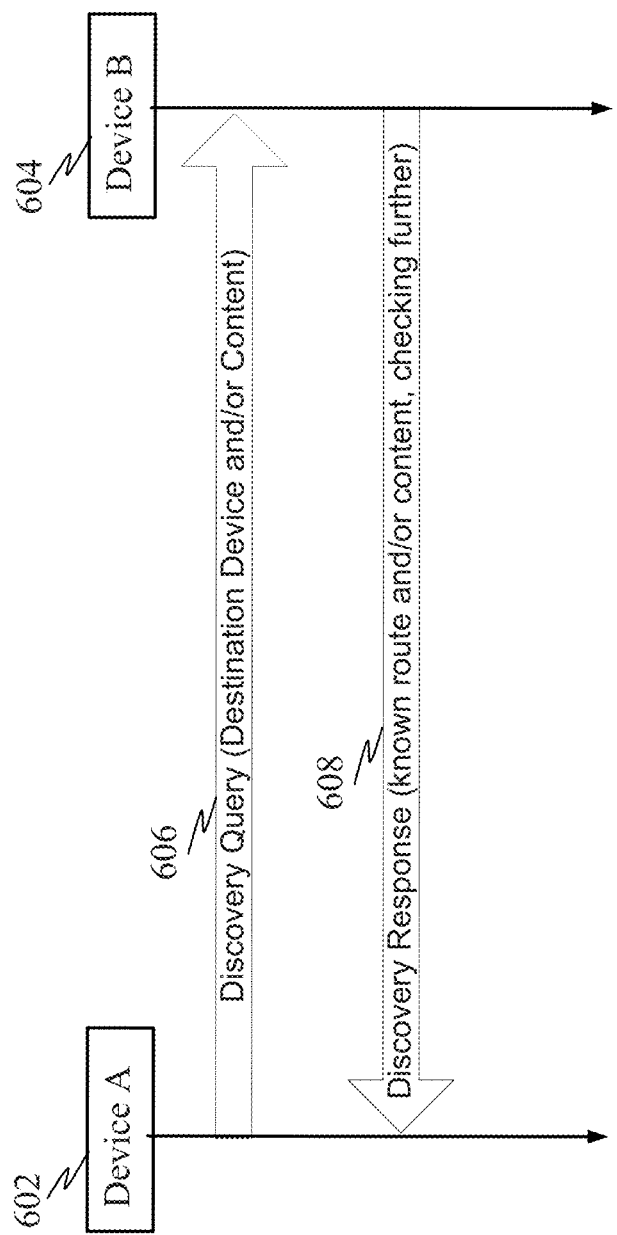
FIG. 6 illustrates an exemplary route discovery procedure in which a device may seek to find a destination (terminating) device and/or content.

FIG. 6 illustrates an exemplary route discovery procedure in which a device may seek to find a terminating device (i.e., a destination device and/or a device having desired content (referred to herein as a content device)). For example, a first device A 602 may send a discovery query 606 to a second device B 604, where the discovery query 606 seeks to discover a route to a third device (C) (not shown) and/or content. Second device B 604 may be a nearby or surrounding device (also referred to herein as a local device). For instance, the second device B 604 may be a particular device where the communication (e.g., voice, message, and/or video) terminates (i.e., destination device or a terminating device, in which case the third device C and the second device B are the same device). As another example, the second device B 604 may be an intermediary device that may be connected to a wider network (e.g., a gateway device to the Internet). As yet another example, the second device B 604 may be a category of device that may host specific content (e.g., content might include system information content, any type of control plane content, user plane content, and/or any combination thereof).

The second device B 604 may reply to the discovery query 606 with a discovery response 608, which may indicate a known route to the terminating device (i.e., third device C and/or the device having the desired content), or may indicate that the request has been forwarded further.

Upon receiving the discovery response 608 from the second device B 604, the first device A 602 may query each device identified in the discovery response 608 (i.e., each device indicated as being on a known route to the terminating device) for their category (e.g., set of resources and/or resource allocations) and may synthesize an aggregate route category and/or metric. The aggregate route category may be synthesized, for example, according to the "weakest link" principle described in connection with FIG. 4, above, or may be synthesized using different metrics or combination of metrics such as link reliability, aggregated bandwidth, aggregated delay and/or other ways known to those of skill in the art. By way of example and not limitation, the aggregate route metric may reflect a sum total of route categories, an average of the sum total of route categories, a number of hops in a given route, different metrics or combination of metrics such as link reliability, aggregated bandwidth, aggregated delay and/or a combination of these and/or other metrics. In one example, such querying for the category of each device along the discovered route may be performed by the first device A 602 and each device along the route. Alternatively, this querying may be performed by a device other than the first device A 602.

Figure 7:
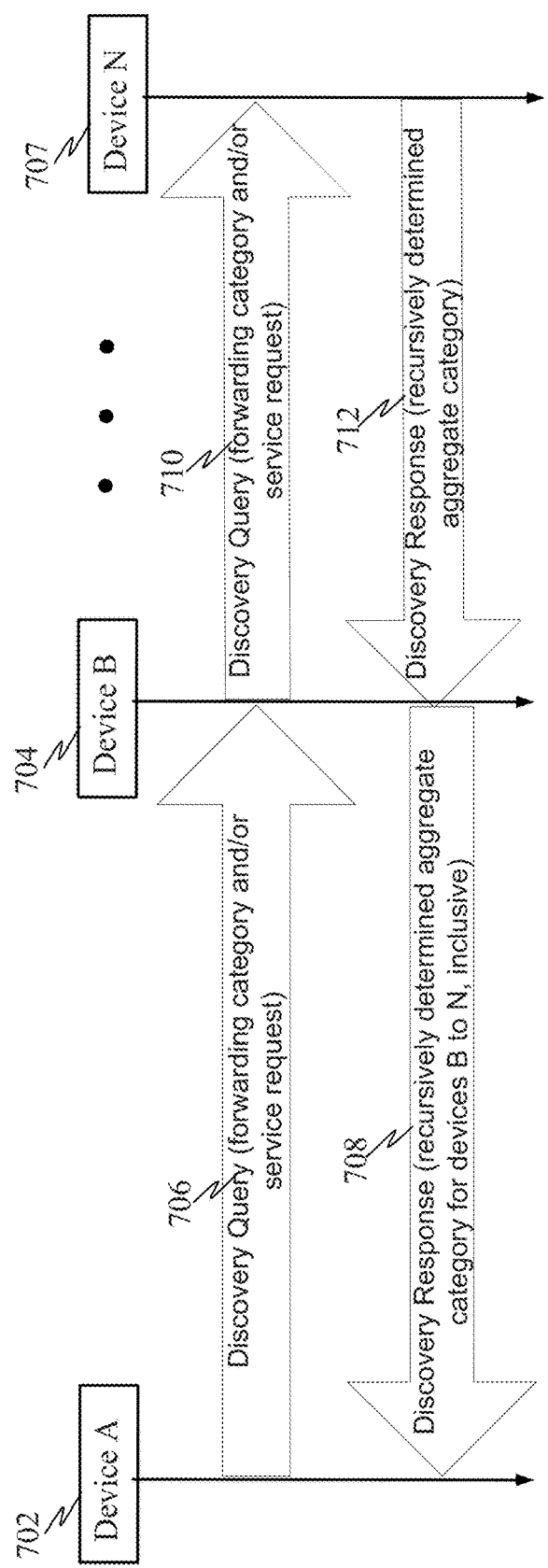
FIG. 7 illustrates another alternative in which an aggregate route category may be recursively determined.

FIG. 7 illustrates an alternative in which an aggregate route category may be recursively determined. According to FIG. 7, a first device A 702 may send a discovery query 706 to a second device B 704. The discovery query 706 may seek to query each device identified in a discovery response (e.g., 608, FIG. 6) (e.g., each device indicated as being on a known route from device A 702 to destination device N 707) for their category (e.g., set of resources and/or resource allocations). Alternatively or additionally, the discovery request 706 may include a service request. Second device B 704 may be a nearby or surrounding device (also referred to herein as a local device). In the example of FIG. 7, the second device B 704 (i.e., the local device B 704) may send one or more discovery queries 710 forward, to facilitate the recursive determination of the aggregate route category. For ease of illustration, the sending of the one or more discovery queries 710 forward is depicted as an action from local device B 704 to destination device N 707. It is understood that the discovery query 710 may represent multiple discovery queries flowing forward via multiple links between multiple intermediate devices (not shown) between local device B 704 and destination device N 707. Links may include point-to-point links.

Upon receiving the discovery query 710, the destination device N 707 may respond with a discovery response 712. The discovery response 712 may include an indication of a category of destination device N 707 for use in recursively determining the aggregate route category. For ease of illustration, the sending of the one or more discovery responses 712 in a return direction is depicted as an action from device N 707 to device B 704. It is understood that the discovery response 712 may represent multiple discovery responses flowing in the return direction via the multiple links between the multiple intermediate devices (not shown) between destination device N 707 and local device B 704. Links may include point-to-point links. By way of example, an aggregate route category may be recursively determined by receiving, at each intermediate device along the route from destination device N 707 to local device B 704, the category of a subsequent device. The category of the subsequent device may be expressed as a recursively determined aggregate route category of all subsequent devices including destination device N 707. At the intermediate device, the received category (or aggregate route category of all subsequent devices including destination device N 707) may be combined with the category of the intermediate device to determine a new aggregate route category. The new aggregate route category may then be forwarded to a preceding device for a next iteration in the determination of the aggregate route category, until the result reaches local device B 704. The requesting device A 702, may then receive a discovery response 708 from the local device B 704. The discovery response 708 may include the aggregate route category for devices B 704 to N 707, inclusive. The aggregate route category for devices B 704 to N 707, inclusive may be determined by combining the aggregate route category received at local device B 704 with the category of local device B 704 in a recursive manner.

Exemplary Wireless Devices, Generally

In a wireless multi-hop system, one or more wireless devices (hereinafter device or devices) may be dispersed throughout a geographic area. Wireless communication between two adjacent devices in a wireless multi-hop system may be implemented as a communication at the lowest level of a protocol stack (e.g., the Layer 1, physical layer in the Open Systems Interconnection (OSI) model protocol stack, the Layer 1, physical (PHY) layer in the long term evolution (LIE) protocol stack, and/or in general the lowest layer relating to over-the-air radio transmissions in a given protocol stack). The communication may be a point-to-point communication. In some examples, the wireless communication in a wireless multi-hop system may be directed to cellular wireless systems implementing devices configured for wireless multi-hop operation.

Devices in a wireless multi-hop system may use wireless signals to communicate with one or more other wireless devices in the multi-hop system. The wireless signals may be in the form of radio waves. Other wireless signals, such as those in the form of infrared waves, are within the scope of this disclosure. Two devices in range of each other may establish a physical layer wireless link between themselves. The link may be a point-to-point link. The physical layer wireless link may be limited to the lowest layer of a protocol stack. A physical layer wireless link joining two adjacent devices may be referred to herein as a wireless link, or a link. Two devices that are not in range of each other (e.g., link cannot be established or has less than desired quality because of, for example, distance or interference) may nevertheless communicate by establishing links with one or more intermediate devices.

For example, if a first wireless device is required to transfer or obtain data from, or otherwise communicate with, a second wireless device, but the first and second wireless devices cannot establish a link directly between themselves, the first wireless device (e.g., the originating device) may communicate with the second wireless device the terminating device) via one or more intermediate wireless devices (e.g., intermediate devices). In a case where a single intermediate device is within range of the originating and terminating devices, but the originating and terminating devices are not within range of each other, the originating device may establish a first link with the single intermediate device and the single intermediate device may establish a second link with the terminating device.

In accordance with examples of the wireless multi-hop system described herein, a route for communication between two devices, regardless of the need for any intermediate devices, does not require that the route pass through a central hub or bus. As explained above, in accordance with the examples described herein, discovery and selection of communication routes on a per link basis may be performed dynamically at the device level.

Devices (i.e., wireless devices) may be referred to by those skilled in the art by various names, including, for example and without limitation, a wireless device, mobile device, a device, a user equipment (UE), a UE device, a device, a station, a mobile station (MS), a subscriber station, a mobile unit, a subscriber unit, a wireless unit, a remote unit, a wireless communications device, a remote device, a mobile subscriber station, a terminal, a mobile terminal, a wireless terminal, a remote terminal, a handset, a user agent, a mobile client, a client, or other suitable terminology.

Examples of mobile wireless devices may include a mobile phone, a pager, a personal digital assistant (PDA), a personal information manager (PIM), a personal media player, a palmtop computer, a laptop computer, a tablet computer, an e-reader and/or other mobile communication/computing devices that communicate through a wireless or cellular network.

Examples of typically non-mobile devices that may include wireless communication circuits, may include a wireless modem, a wireless access point (AP), a television, an appliance, a digital video recorder (DVR), any device included in a network of the Internet of Things (IOT).

For exemplary purposes, examples of multi-hop systems described herein depict multi-hop systems that include mobile devices; however, multi-hop systems may include one or more non-mobile devices in addition to mobile devices, without departing from the scope of the disclosure.

Exemplary Originating (Requesting) Device

Figure 8:
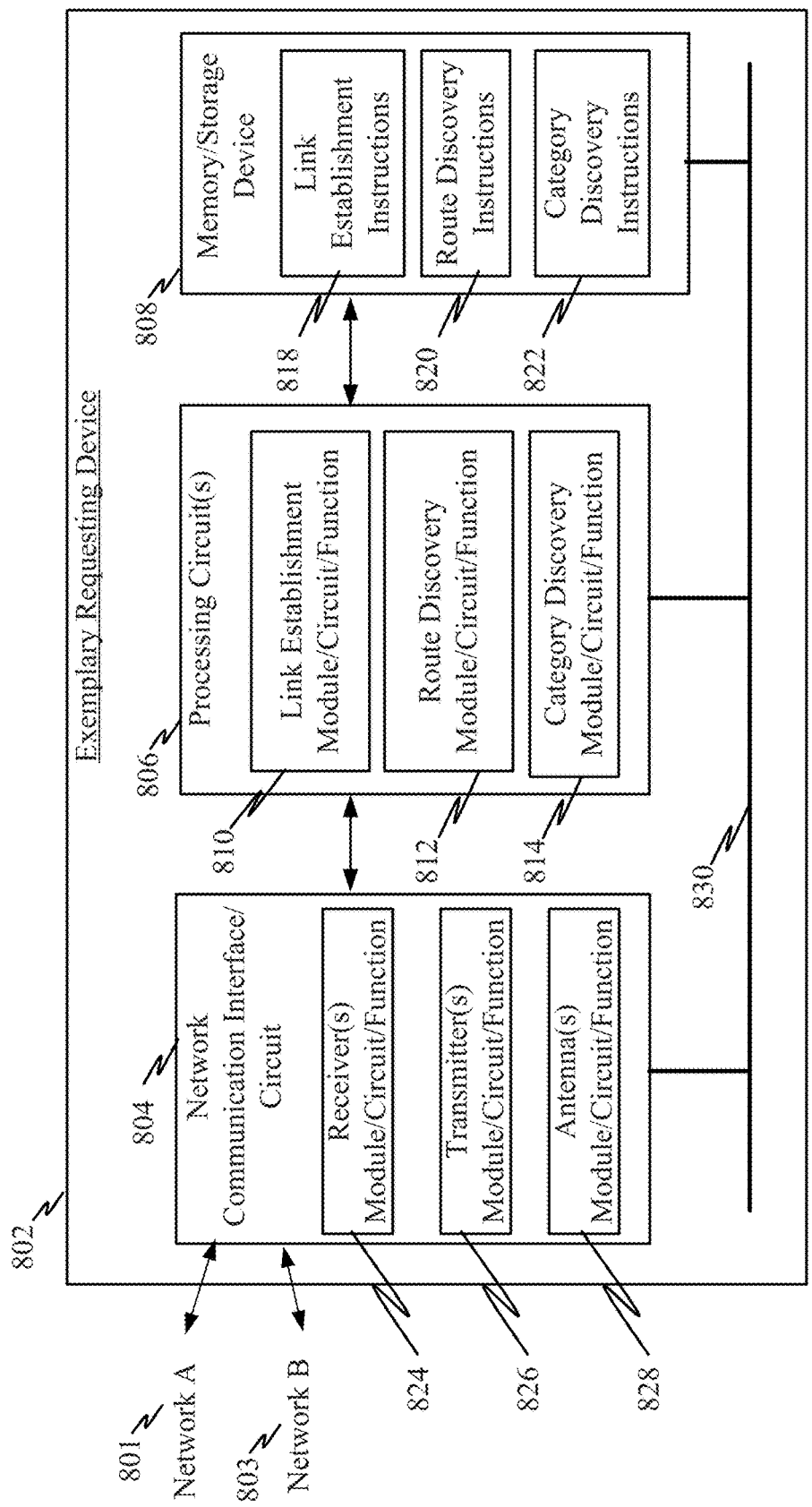
FIG. 8 illustrates an exemplary device configured for per link category discovery and per link route discovery.

FIG. 8 illustrates an exemplary wireless device 802 configured for per link category discovery and per link route discovery. Wireless device 802 may be operational as a device that originates discovery queries for a first wireless link. It should be understood that wireless device 802, while operating on a first wireless link with a second device (not shown) as an originating device, may additionally operate on a second wireless link with a third device (not shown) as an intermediate or terminating device in connection with a wireless link with the third device.

As used herein, an originating device may be referred to as a requesting device. An intermediate or terminating device may be referred to as a local device.

The exemplary wireless device 802 of FIG. 8 may include a wireless network communication interface/circuit 804, one or more processing circuits 806, and a memory/storage device 808 that are operationally coupled to one another. In the exemplary illustration of FIG. 8, the wireless network communication interface/circuit 804, processing circuit(s) 806, and memory/storage device 808 are operationally coupled via at least a two-way communication bus 830 that can be accessed by all modules, circuit, and/or functions, such communication buses 830 are well understood and will not be explained herein. The wireless network communication interface/circuit 804, one or more processing circuits 806, and memory/storage device 808 are described below.

Exemplary Wireless Network Communication Interface/Circuit

The wireless network communication interface/circuit 804, may serve to couple the wireless device 802 to one or more networks, for example, network A 801 and/or network B 803 using one or more wireless access technologies that facilitate establishing a wireless link to other devices. Accordingly, the wireless network communication interface/circuit 804 may be configured to facilitate wireless communications of the wireless device 802. For example, the wireless network communication interface/circuit 804 may include circuitry and/or programming adapted to facilitate the communication of information bi-directionally with respect to one or more wireless UE devices in Network A 801 and/or Network B 803. The wireless network communication interface/circuit 804 may include one or more receiver module/circuit/functions 824, one or more transmitter module/circuit/functions 826, and/or one or more antenna module/circuit/functions 828. The receiver(s) 824, transmitter(s) 826, and antenna(s) 828 may be operationally coupled to one another. The one or more antennas 828 may facilitate wireless communication with the one or more wireless UE devices in Network A 801 and/or Network B 803.

Exemplary Processing Circuit(s)

One or more processing circuits 806 may be operationally coupled to the wireless network communication interface/circuit 804. For ease of illustration, one processing circuit 806 is illustrated. The processing circuit 806 may include a link establishment module/circuit/function 810, a category discovery module/circuit/function 814, and/or a route discovery module/circuit/function 812. The processing circuit 806 may be arranged to obtain, process and/or send data, control data access and storage, issue commands, and control other desired operations. The processing circuit 806 may include circuitry adapted to implement desired programming provided by appropriate non-transient media in at least one example. For example, the processing circuit 806 may be implemented as one or more processors, one or more controllers, and/or other structure configured to execute executable programming Examples of the processing circuit 806 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 806 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 806 are for illustration and other suitable configurations are within the scope of the present disclosure are also contemplated.

The processing circuit 806 may be adapted for processing, including the execution of programming, which may be stored on the memory/storage device 808. As used herein, the term "programming" may be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Exemplary Memory/Storage Device

The memory/storage device 808 may be operationally coupled to the processing circuit(s) 806 and may also may be operationally coupled to the network communication interface/circuit 804. The memory/storage device 808 may include link establishment instructions 818, route discovery instructions 820, and/or category discovery instructions 822.

The memory/storage device 808 may include one or more non-transient computer-readable, machine-readable, and/or processor-readable devices for storing programming, such as processor executable code or instructions (e.g., software, firmware), electronic data, databases, or other digital information. The memory/storage device 808 may also be used for storing data that may be manipulated by the processing circuit 806 when executing programming. The memory/storage device 808 may be any available non-transient media that can be accessed by a general purpose or special purpose processor, including portable or fixed storage devices, optical storage devices, and various other non-transient media adapted to store, contain, and/or carry programming By way of example and not limitation, the memory/storage device 808 may include a non-transient computer-readable, machine-readable, and/or processor-readable storage medium such as a magnetic storage device (e.g., hard disk, floppy disk, magnetic strip), an optical storage device (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other media for non-transient storage of programming, as well as any combination thereof.

The memory/storage device 808 may be coupled to the processing circuit 806 such that the processing circuit 806 can read information from, and write information to, the memory/storage device 808. That is, the memory/storage device 808 can be coupled to the processing circuit 806 so that the memory/storage device 808 may be at least accessible by the processing circuit 806, including examples where the memory/storage device 808 may be integral to the processing circuit 806 and/or examples where the memory/storage device 808 may be separate from the processing circuit 806.

Programming stored by the memory/storage device 808, when executed by the processing circuit 806, may cause the processing circuit 806 to perform one or more of the various functions and/or process steps described herein. Thus, according to one or more aspects of the present disclosure, the processing circuit 806 may be adapted to perform (in conjunction with the memory/storage device 808) any or all of the processes, functions, steps, and/or routines associated with exemplary wireless device 802 described herein. As used herein, the term "adapted" in relation to the processing circuit 806 may refer to the processing circuit 806 being one or more of configured, employed, implemented, and/or programmed (in conjunction with the memory/storage device 808) to perform a particular process, function, step, and/or routine according to various features described herein.

Exemplary Terminating (Local, Intermediate, Destination, Content) Device

Figure 9:
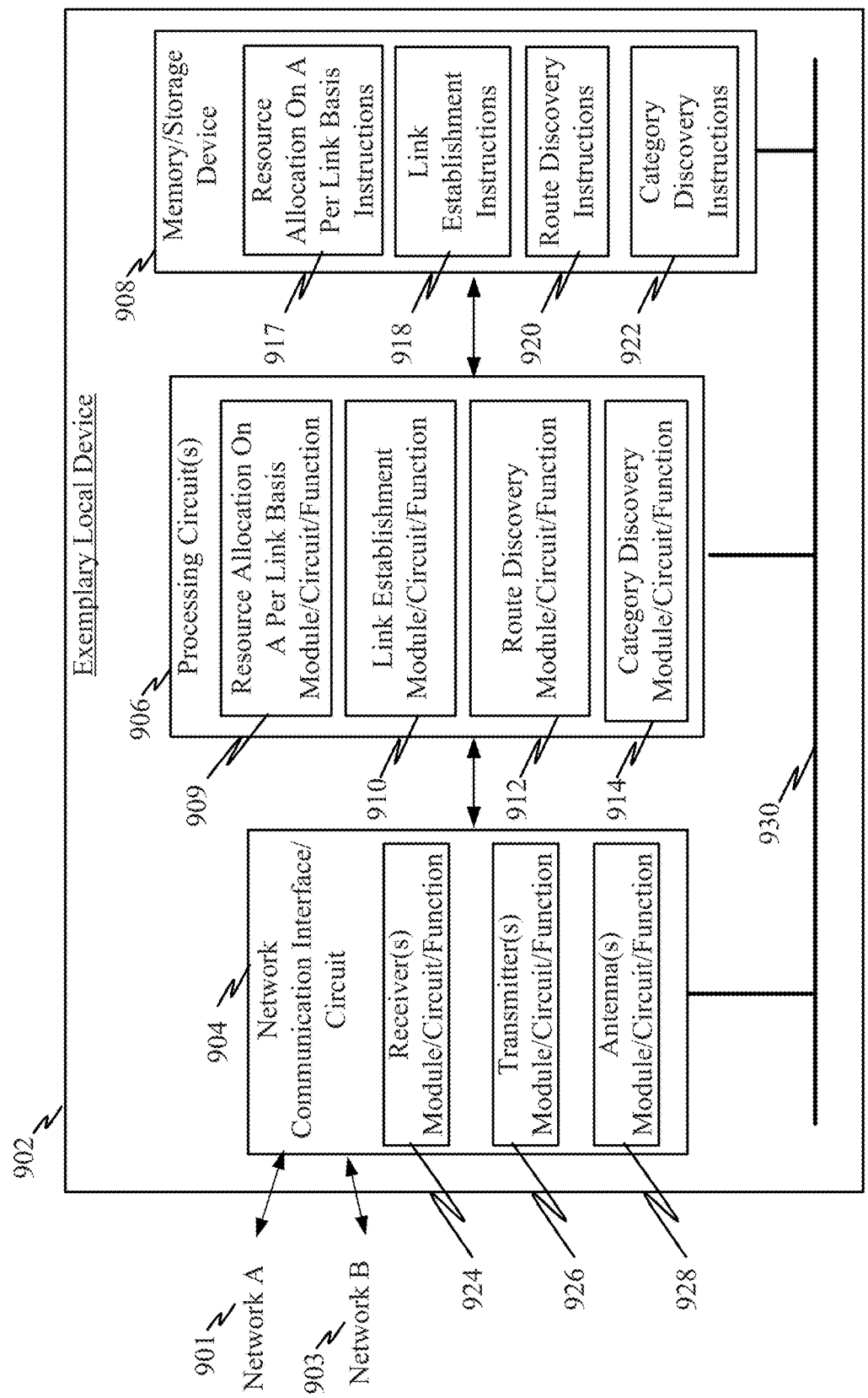
FIG. 9 illustrates another exemplary device configured for per link category discovery and per link route discovery.

FIG. 9 illustrates an exemplary wireless device 902 configured for per link category discovery and per link route discovery. Wireless device 902 may be operational as a local device that receives and responds to discovery queries and responses between devices, as an intermediate device, and/or as a device that terminates discovery queries, such as a destination and/or content device.

Nothing herein prevents the exemplary wireless device 902 from being operational as an originating (requesting) device.

The exemplary wireless device 902 of FIG. 9 may include a wireless network communication interface/circuit 904, one or more processing circuits 906, and a memory/storage device 908 that are operationally coupled to one another. In the exemplary illustration of FIG. 9, the wireless network communication interface/circuit 904, processing circuit(s) 906, and memory/storage device 908 are operationally coupled via at least a two-way communication bus 930 that can be accessed by all modules, circuit, and/or functions, such communication buses 930 are well understood and will not be explained herein. The wireless network communication interface/circuit 904, one or more processing circuits 906, and memory/storage device 908 are described below.

Exemplary Wireless Network Communication Interface/Circuit

The wireless network communication interface/circuit 904, may serve to couple the wireless device 902 to one or more networks, for example, network A 901 and/or network B 903 using one or more wireless access technologies that facilitate establishing a wireless link to other devices. Accordingly, the wireless network communication interface/circuit 904 may be configured to facilitate wireless communications of the wireless device 902. For example, the wireless network communication interface/circuit 904 may include circuitry and/or programming adapted to facilitate the communication of information bi-directionally with respect to one or more wireless UE devices (e.g., devices) in Network A 901 and/or Network B 903. The wireless network communication interface/circuit 904 may include including at least one receiver module/circuit/function 924 and/or at least one transmitter module/circuit/function 926. The wireless network communication interface/circuit 904 may also include one or more antenna modules/circuits/functions 928 operationally coupled to the at least one receiver 924 and/or at least one transmitter 926. The one or more antennas 928 may facilitate wireless communication with the one or more wireless UE devices (e.g., devices) in Network A 901 and/or Network B 903.

Exemplary Processing Circuit(s)

One or more processing circuits 906 may be operationally coupled to the wireless network communication interface/circuit 904. For ease of illustration, one processing circuit 906 is illustrated. The processing circuit 906 may include a resource allocation on a per link basis module/circuit/function 909, a link establishment module/circuit/function 910, a route discovery module/circuit/function 912, and/or a category discovery module/circuit/function 914. The processing circuit 906 may be arranged to obtain, process and/or send data, control data access and storage, issue commands, and control other desired operations. The processing circuit 906 may include circuitry adapted to implement desired programming provided by appropriate non-transient media in at least one example. For example, the processing circuit 906 may be implemented as one or more processors, one or more controllers, and/or other structure configured to execute executable programming. Examples of the processing circuit 906 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 906 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 906 are for illustration and other suitable configurations are within the scope of the present disclosure are also contemplated.

The processing circuit 906 may be adapted for processing, including the execution of programming, which may be stored on the memory/storage device 908. As used herein, the term "programming" may be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Exemplary Memory/Storage Device

The memory/storage device 908 may be operationally coupled to the processing circuit(s) 906 and may also be operationally coupled to the network communication interface/circuit 904. The memory/storage device 908 may include resource allocation on a per link basis instructions 917, link establishment instructions 918, route discovery instructions 920, and/or category discovery instructions 922.

The memory/storage device 908 may include one or more non-transient computer-readable, machine-readable, and/or processor-readable devices for storing programming, such as processor executable code or instructions (e.g., software, firmware), electronic data, databases, or other digital information. The memory/storage device 908 may also be used for storing data that may be manipulated by the processing circuit 906 when executing programming. The memory/storage device 908 may be any available non-transient media that can be accessed by a general purpose or special purpose processor, including portable or fixed storage devices, optical storage devices, and various other non-transient media adapted to store, contain, and/or carry programming. By way of example and not limitation, the memory/storage device 908 may include a non-transient computer-readable, machine-readable, and/or processor-readable storage medium such as a magnetic storage device (e.g., hard disk, floppy disk, magnetic strip), an optical storage device (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other media for non-transient storage of programming, as well as any combination thereof.

The memory/storage device 908 may be coupled to the processing circuit 906 such that the processing circuit 906 can read information from, and write information to, the memory/storage device 908. That is, the memory/storage device 908 can be coupled to the processing circuit 906 so that the memory/storage device 908 may be at least accessible by the processing circuit 906, including examples where the memory/storage device 908 may be integral to the processing circuit 906 and/or examples where the memory/storage device 908 may be separate from the processing circuit 906.

Figure 11:
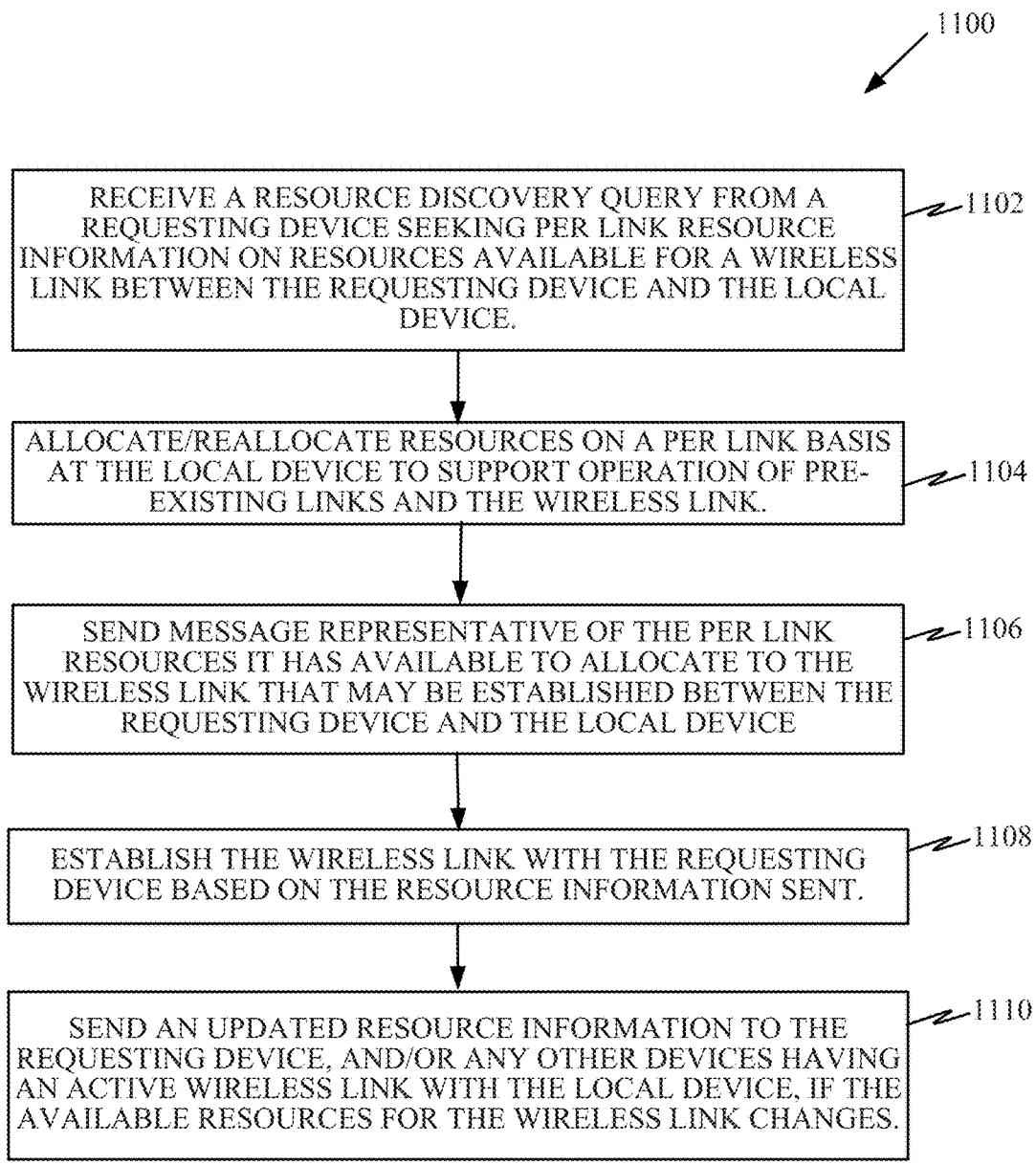
FIG. 11 is a flow diagram illustrating a method operational by a local device to provide resource information to an originating device on a per link basis.
Figure 12:
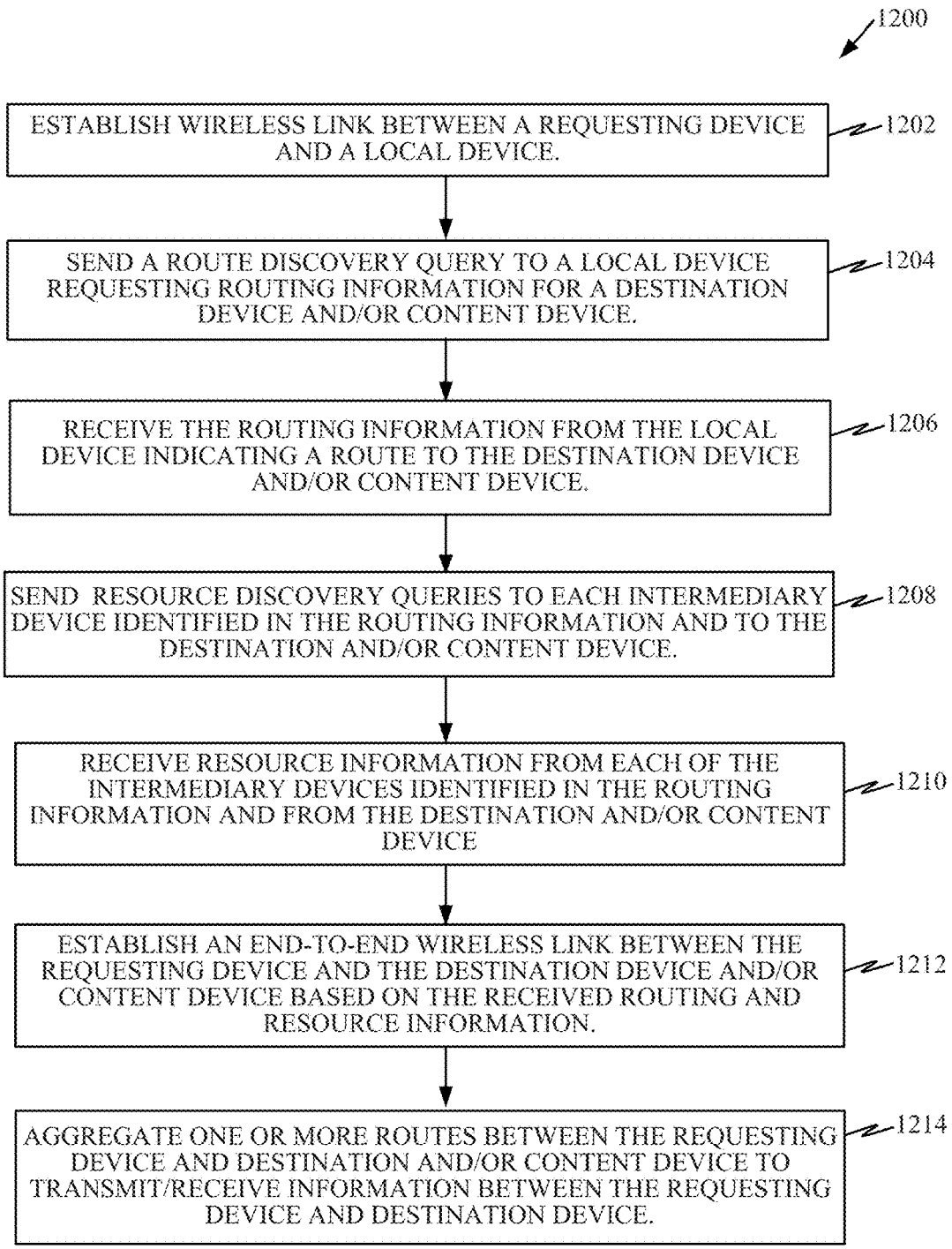
FIG. 12 is a flow diagram illustrating a method operational by a local device to provide route discovery to an originating device on a per link basis.

Programming stored by the memory/storage device 908, when executed by the processing circuit 906, may cause the processing circuit 906 to perform one or more of the various functions and/or process steps described herein. Thus, according to one or more aspects of the present disclosure, the processing circuit 906 may be adapted to perform (in conjunction with the memory/storage device 908) any or all of the processes, functions, steps, and/or routines associated with exemplary device 902 described herein. As used herein, the term "adapted" in relation to the processing circuit 906 may refer to the processing circuit 906 being one or more of configured, employed, implemented, and/or programmed (in conjunction with the memory/storage device 908) to perform a particular process, function, step, and/or routine according to various features described herein, Exemplary Methods of Operation Three methods of operation are described below with reference to FIGS. 10, 11, and 12. Each method of operation may be operational at a device utilizing, for example, the exemplary wireless devices of FIGS. 8 and/or 9. Each method of operation may be operational at an originating, intermediate, and or terminating device. However, for expository purposes, the method of FIG. 10 is described with respect to an originating device identified as a requesting device and the methods of FIGS. 11 and 12 are described with respect to an intermediate device or a terminating device collectively identified as a local device.

Exemplary Method to Obtain Resource Information on a Per Link Basis

Figure 10:
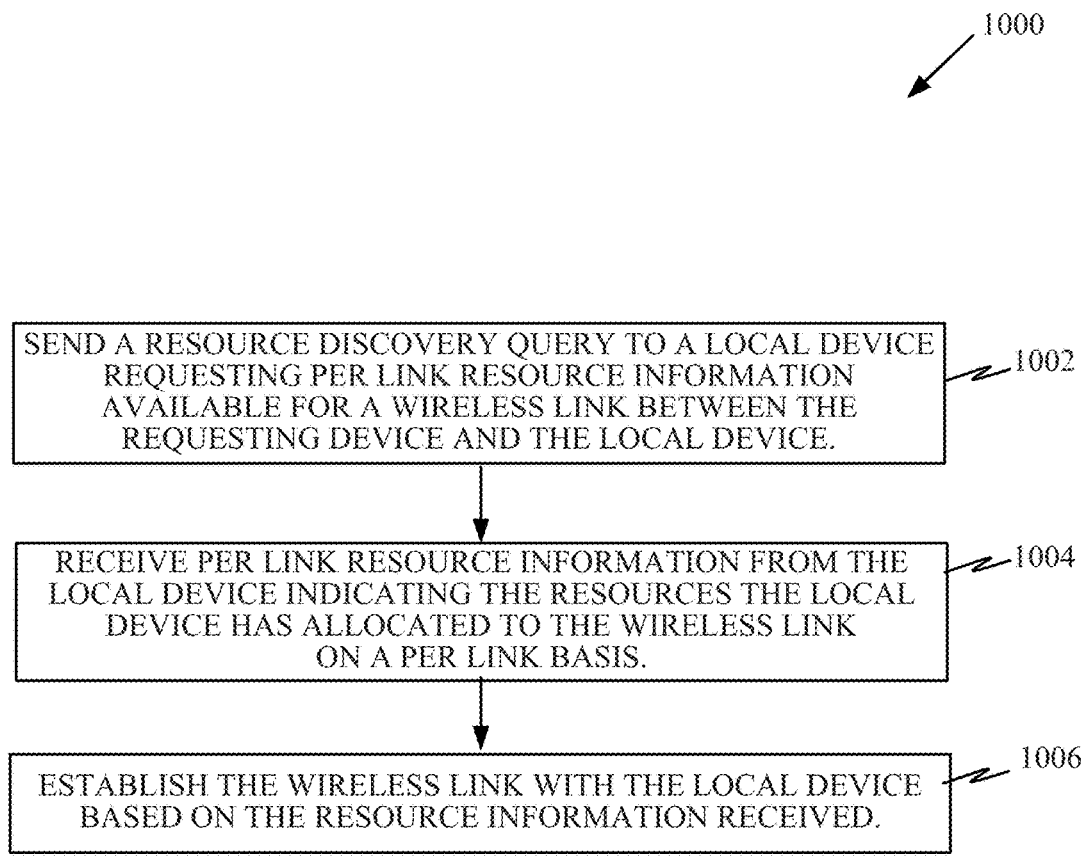
FIG. 10 is a flow diagram illustrating a method operational by an originating device to obtain resource information from other devices on a per link basis.

FIG. 10 is a flow diagram illustrating a method 1000 operational by an originating device (referred to for expository purposes as a requesting device) to obtain resource information on a per link basis from a local device (referred to for expository purposes as a local device) for a wireless link between the requesting device and the local device. The method may begin at 1002, where the requesting device may send, to the local device, a resource discovery query requesting per link resource information available for a wireless link between the requesting device and the local device. The request for resource information on the per link basis may be a request for resources that are available from the local device for the wireless link between the requesting device and the local device. The wireless link may be a new wireless link or an updated wireless link.

At 1004, in response, the requesting device may receive per link resource information from the local device indicating the resources the local device has available to allocate and/or has allocated to the wireless link on a per link basis prior to establishing the link. The response may be indicative of the reorganization (e.g., by reallocating resources) by the local device of resources including resources in use for pre-existing links and resources to be allocated to, for example, the wireless link.

At 1006, the requesting device may then establish the wireless link with the local device based on the resource information received. The wireless link between the requesting device and the local device may be a point-to-point wireless link. The point-to-point wireless link may be one of a plurality of wireless links established by the requesting device, Exemplary Method to Provide Resource Information on a Per Link Basis FIG. 11 is a flow diagram illustrating a method 1100 operational by a wireless device in accordance with the disclosure (referred to for expository purposes as a local device) to provide resource information on a per link basis to an originating device (referred to for expository purposes as a requesting device) for a wireless link between the requesting device and the local device. The method may begin at 1102, the local device may receive, from the requesting device, a resource discovery query seeking per link resource information on resources available for a wireless link between the requesting device and the local device. The wireless link may be a new wireless link or an updated wireless link.

At 1104, the local device may allocate (e.g., pre-allocate, reserve, or set aside) or reallocate resources to the requesting device on a per link basis, from a set of resources available to the local device. The allocation/reallocation permits the local device to support operation of pre-existing links and future operation of the wireless link. The resources available to the requesting device may depend on the amount of each resource, in the set of resources of the local device, which the local device agrees to allocate, and thereafter allocates, to the wireless link associated with the requesting device. The resources available to the requesting device may additionally or alternatively depend on the amount of each resource already allocated to n other links, where n≥0, that may be currently active on the local device. The resources available to the requesting device may be impacted by the resources already allocated to the n other links. Additionally or alternatively, the local device may alter, or negotiate to alter, the amount of resources already allocated to one or more of the n other links that are currently active on the local device. In this or other ways, the local device may be able to obtain a given level of resources for an n+1$^{th}$ link to be established with the requesting device. In accordance with this exemplary method, the local device may determine the resources it may agree to allocate on the per link basis with the requesting device and allocate (e.g., pre-allocate, reserve, or set aside) those resources before the link is established. By, for example, pre-allocating, reserving, or setting aside the resources for a requested wireless link with the requesting device, the local device may ensure an ability to accommodate the requested wireless link. The requested wireless link may be one link in addition to the n links that may be currently active on the local device, if or when the requested link is established. In an alternative example, the local device may allocate resources on a per link basis (e.g., in anticipation of servicing a predetermined number of links) before receiving, from the requesting device, a resource discovery query seeking per link resource information on resources available for a wireless link between the requesting device and the local device. In the alternative example, the resources available to the requesting device may depend on one or more of the same factors discussed above.

At 1106, the local device may send a message representative of the per link resources it has available to allocate to the wireless link that may be established between the requesting device and the local device. The message may be indicative of the reorganization (e.g., by reallocation) by the local device of resources including resources in use for pre-existing links and resources to be allocated to, for example, the requested wireless link. A reallocation may be needed if, for example, a first allocation of a first resource between links varies with respect to a second allocation of a second resource between the links.

At 1108, the local device may then establish the requested wireless link with the requesting device based on the resource information sent to the requesting device.

At 1110, updated resource information may be sent to the requesting device, and/or any other of the n devices with which the local device has an active link (e.g., an active wireless link), where the updated resource information may reflect a dynamic alteration in apportioning of at least one resource being used to maintain an active wireless link with the local device. Additionally, updated resource information may be sent to the access node if the local device has an active link (e.g., an active wireless link) with the access node. Each link may be a point-to-point link.

The wireless link between the requesting device and the local device may be a point-to-point wireless link. The point-to-point wireless link may be one of a plurality of wireless links established by the local device.

Exemplary Method to Obtain Route Discovery Information on a Per Link Basis

FIG. 12 is a flow diagram illustrating a method 1200 operational by an originating device (referred to for expository purposes as a requesting device) to obtain route discovery information on a per link basis from a local device (referred to for expository purposes as a local device) for a route to a destination device and/or a content device.

The method may begin at 1202, where a wireless link between a requesting device and a local device may be established. At 1204, the requesting device may send, to the local device, a route discovery query requesting routing information for a destination device and/or a content device. At 1206, in response, the requesting device may receive the routing information from the local device indicating a route to the destination device and/or content device. Such routing information may identify one or more intermediary devices along a route to reach the destination device and/or content device.

At 1208, the requesting device may send a resource discovery query to each of the one or more intermediary devices identified in the routing information, where the information can be sent to the destination device and/or content device.

At 1210, the requesting device may receive a response including resource information from each of the one or more intermediary devices identified in the routing information and from the destination device and/or content device. The resource information may identify the resources allocated (e.g., pre-allocated, reserved, or set aside) or reallocated on a per link basis by each of the one or more intermediary devices, prior to establishing an end-to-end link. Each response may be indicative of a reorganization (e.g., by reallocation) of resources, at the respective one or more intermediary devices and the destination device, where the reorganization of resources may include the reallocation of resources used for pre-existing links and resources to be allocated to, for example, the wireless link.

At 1212, the requesting device may establish the end-to-end wireless link from the requesting device, through the first local device and the one or more intermediary devices, to the destination device and/or content device based on the resource information received for each intermediary device and for the destination device and/or content device. The end-to-end link may include multiple links between two or more intermediary devices. The multiple links may include at least one point-to-point link.

At 1214, the requesting device may aggregate one or more routes between the requesting device and destination device and/or content device and transmit or receive information (e.g., data traffic) between the requesting device and destination device and/or content device.

One or more of the components, steps, features, and/or functions illustrated in the figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the examples may be described as a process depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (RUM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines, and/or devices.

Furthermore, examples may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the examples disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the examples described herein can be implemented in different systems without departing from the scope of the disclosure. It should be noted that the foregoing examples are merely examples and are not to be construed as limiting the invention. The description of the examples is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a requesting device, the method comprising:
sending a resource discovery query to a local device requesting per link resource information available for a wireless link between the requesting device and the local device;
receiving per link resource information indicating resources allocated by the local device to the wireless link, wherein the resources allocated are based on a reallocation of resources at the local device to support operation of a pre-existing link and the wireless link, prior to establishing the wireless link, and wherein the resource information is expressed as a category in a set of categories, and each category in the set of categories represents one or more resources and defines an amount of each resource represented by the category, wherein at least one of the resources is a processing power resource that the local device has available to allocate to the wireless link with the requesting device, and further wherein the resource information includes recursively-determined route category information for one or more devices between the requesting device and the destination device based on route category information obtained at one or more intermediate devices along a route from the local device to the destination device for a route category of a subsequent device, where the route category of the subsequent device is a recursively-determined aggregate route category of all subsequent devices including the destination device; and
establishing the wireless link with the local device based on the resource information received and based on a metric that relates increasing processing power resources to increasing link reliability.

2. The method of claim 1, wherein the wireless link is a new wireless link or an updated wireless link.

3. The method of claim 1, wherein the requesting device and the local device are mobile wireless devices.

4. The method of claim 1, wherein the wireless link originates at the requesting device and terminates at the local device or originates at the local device and terminates at the requesting device.

5. The method of claim 1, wherein the wireless link is at a lowest level of a protocol stack.

6. The method of claim 1, wherein the wireless link is a point-to-point link.

7. The method of claim 1, further comprising:
receiving updated resource information, wherein the updated resource information reflects a dynamic alteration in an amount of at least one resource used for the wireless link between the requesting device and the local device.

8. The method of claim 1, further comprising:
sending a route discovery query to the local device requesting routing information for the destination device and/or a content device; and
receiving the routing information from the local device indicating a route to the destination device and/or the content device.

9. The method of claim 1, wherein the resource information is based on a partitioning on a per link basis by the local device of resources of the local device between an amount of resources dedicated to traffic of the local device and an amount of resources dedicated to forwarding traffic.

10. The method of claim 1, wherein the requesting device queries each of the intermediate devices along a route through the local device for their category and, based on responsive information, synthesizes an aggregate route category.

11. The method of claim 10, wherein the aggregate route category is synthesized based, at least in part, on an identification of a weakest link among links through the set of intermediate devices.

12. The method of claim 10, wherein aggregating the first and second routes into the aggregated route is based, at least in part, on the aggregate route category.

13. The method of claim 1, wherein the requesting device determines whether specific content is available on a relatively less distant device having fewer hops on a multi-hop route to avoid obtaining the content from a relatively more distant device having more hops on the multi-hop route.

14. The method of claim 1, wherein establishing the wireless link includes establishing an end-to-end wireless link through the local device and one or more intermediate devices based on resource information received for each intermediate device, the end-to-end wireless link selected from among multiple links based on the metric that relates increasing processing power resources to increasing link reliability.

15. The method of claim 1, further comprising
aggregating first and second routes between the requesting device and a destination device into an aggregated route, with the first route connected through the local device and the second route omitting the local device; and
transmitting information between the requesting device and the destination device along the first and second routes of the aggregated route.

16. The method of claim 1, wherein the recursively-determined route category information is obtained based in part on multiple discovery queries flowing forward toward the destination device via multiple links between multiple intermediate devices.

17. The method of claim 1, wherein the recursively-determined route category information comprises sponsored connectivity information.

18. The method of claim 1, further comprising negotiating to alter an amount of resources already allocated to one or more links that are currently active on the local device to obtain a particular level of resources for an additional link to be established with the requesting device.

19. The method of claim 1, further comprising pre-allocating resources before a link is established to ensure accommodation of a requested wireless link.

20. A requesting device, comprising:
a wireless network interface configured to communicate with one or more local devices;
a processing circuit coupled to the wireless network interface, the processing circuit configured to:
send a resource discovery query to a local device requesting per link resource information available for a wireless link between the requesting device and the local device;
receive per link resource information indicating resources allocated by the local device to the wireless link, wherein the resources allocated are based on a reallocation of resources at the local device to support operation of a pre-existing link and the wireless link, prior to establishing the wireless link, and wherein the resource information is expressed as a category in a set of categories, and each category in the set of categories represents one or more resources and defines an amount of each resource represented by the category, wherein at least one of the resources is a processing power resource that the local device has available to allocate to the wireless link with the requesting device, wherein the resource information includes recursively-determined route category information for one or more devices between the requesting device and the destination device based on route category information obtained at one or more intermediate devices along a route from the local device to the destination device for a route category of a subsequent device, where the route category of the subsequent device is a recursively-determined aggregate route category of all subsequent devices including the destination device; and
establish the wireless link with the local device based on the resource information received and based on a metric that relates increasing processing power resources to increasing link reliability.

21. The requesting device of claim 20, wherein the wireless link is a new wireless link or an updated wireless link.

22. The requesting device of claim 20, wherein the wireless network interface is configured to communicate with the local device via the wireless link at a lowest level of a protocol stack.

23. The requesting device of claim 20, wherein the processing circuit is further configured to:
send a route discovery query to the local device requesting routing information for the destination device and/or a content device; and
receive the routing information from the local device indicating a route to the destination device and/or the content device.

24. The requesting device of claim 20, wherein the resource information is based on a partitioning on a per link basis by the local device of resources of the local device between an amount of resources dedicated to traffic of the local device and an amount of resources dedicated to forwarding traffic.

25. The requesting device of claim 20, wherein the requesting device queries each of a set of intermediate devices along a route through the local device for their category and, based on responsive information, synthesizes an aggregate route category.

26. The requesting device of claim 20, wherein the requesting device determines whether specific content is available on a relatively less distant device having fewer hops on a multi-hop route to avoid obtaining the content from a relatively more distant device having more hops on the multi-hop route.

27. The requesting device of claim 20, wherein the processing circuit is further configured to establish the wireless link by establishing an end-to-end wireless link through the local device and one or more intermediate devices based on resource information received for each intermediate device, the end-to-end wireless link selected from among multiple links based on the metric that relates increasing processing power resources to increasing link reliability.

28. The requesting device of claim 20, wherein the processing circuit is further configured to:
aggregate first and second routes between the requesting device and a destination device into an aggregated route, with the first route connected through the local device and the second route omitting the local device; and
transmit information between the requesting device and the destination device along the first and second routes of the aggregated route.

29. The requesting device of claim 20, wherein the processing circuit is further configured to obtain the recursively-determined route category information based in part on multiple discovery queries flowing forward toward the destination device via multiple links between multiple intermediate devices.

30. The requesting device of claim 20, wherein the recursively-determined route category information comprises sponsored connectivity information.

31. The requesting device of claim 20, wherein the processing circuit is further configured to negotiate to alter an amount of resources already allocated to one or more links that are currently active on the local device to obtain a particular level of resources for an additional link to be established with the requesting device.

32. The requesting device of claim 20, wherein the processing circuit is further configured to pre-allocate resources before a link is established to ensure accommodation of a requested wireless link.

33. A method operational at a local device, the method comprising:
   receiving a resource discovery query from a requesting device seeking per link resource information available for a wireless link between the requesting device and the local device;
   reallocating resources from a set of resources available to the local device, on a per link basis, to support operation of a pre-existing link and the wireless link;
   sending per link resource information to the requesting device indicating the resources allocated by the local device to support operation of the wireless link prior to establishing the wireless link, wherein the resource information is expressed as a category in a set of categories, and each category in the set of categories represents one or more resources and defines an amount of each resource represented by the category, wherein at least one of the resources is a processing power resource that the local device has available to allocate to the wireless link with the requesting device, and further wherein the resource information includes recursively-determined route category information for one or more devices between the requesting device and the destination device based on route category information obtained at one or more intermediate devices along a route from the local device to the destination device for a route category of a subsequent device, where the route category of the subsequent device is a recursively-determined aggregate route category of all subsequent devices including the destination device;
   establishing the wireless link with the requesting device based on the resource information sent and based on a metric that relates increasing processing power resources to increasing link reliability.

34. The method of claim 33, wherein allocating resources on the per link basis includes apportioning each resource the local device has available between a first link and a second link.

35. The method of claim 33, wherein the local device allocates each resource in the set of resources between at least a first wireless link and a second wireless link, wherein the first wireless link is between the requesting device and the local device and the second wireless link is between the local device and an access node.

36. The method of claim 35, wherein a first allocation of a first resource between the first and second links varies with respect to a second allocation of a second resource between the first and second links.

37. The method of claim 35, wherein resources in the set of resources are shared between the first and second wireless links.

38. The method of claim 33, wherein the wireless link is at a lowest level of a protocol stack.

39. The method of claim 33 further comprising:
   sending updated resource information, wherein the updated resource information reflects a dynamic alteration in apportioning of at least one resource being used to maintain an established wireless link between the requesting device and the local device.

40. The method of claim 33, wherein establishing the wireless link comprises establishing an end-to-end wireless link through the local device and one or more intermediate devices based on resource information received for each intermediate device, the end-to-end wireless link selected from among multiple links based on the metric that relates increasing processing power resources to increasing link reliability.

41. The method of claim 33, wherein the metric further relates the resources to aggregated bandwidth and/or aggregated delay.

42. The method of claim 33, further comprising
   aggregating first and second routes between the requesting device and a destination device into an aggregated route; and
   transmitting information between the local device and the destination device along the first and second routes of the aggregated route.

43. The method of claim 33, wherein the recursively-determined route category information is obtained based in part on multiple discovery queries flowing forward toward the destination device via multiple links between multiple intermediate devices.

44. The method of claim 33, wherein the recursively-determined route category information comprises sponsored connectivity information.

45. The method of claim 33, further comprising negotiating to alter an amount of resources already allocated to one or more links that are currently active on the local device to obtain a particular level of resources for an additional link to be established with the requesting device.

46. The method of claim 33, further comprising pre-allocating resources before a link is established to ensure accommodation of a requested wireless link.

47. A local device, comprising:
   a wireless network interface configured to communicate data traffic with one or more local devices;
   a processing circuit coupled to the wireless network interface, the processing circuit configured to:
      receive a resource discovery query from a requesting device seeking per link resource information available for a wireless link between the requesting device and the local device;
      reallocate resources from a set of resources available to the local device, on a per link basis, to support operation of a pre-existing link and the wireless link;
      send per link resource information to the requesting device indicating the resources allocated by the local device to support operation of the wireless link prior to establishing the wireless link, wherein the resource information is expressed as a category in a set of categories, and each category in the set of categories represents one or more resources and defines an amount of each resource represented by the category, and wherein at least one of the resources is a processing power resource that the local device has available to allocate to the wireless link with the requesting device, and further wherein the resource information includes recursively-determined route category information for one or more devices between the requesting device and the destination device based on route category information obtained at one or more intermediate devices along a route from the local device to the destination device for a route category of a subsequent device, where the route category of the subsequent device is a recursively-determined aggregate route category of all subsequent devices including the destination device; and establish the wireless link with the requesting device based on the resource information sent and based on a metric that relates increasing processing power resources to increasing link reliability.

48. The local device of claim 47, where the one or more local devices include the requesting device, an intermediate device, and/or the destination device.

49. The local device of claim 47, wherein the processing circuit is further configured to:
send updated resource information to devices with which the local device has an active wireless link, and to an access node if the local device maintains an active wireless link with the access node.

50. The local device of claim 47, wherein:
the local device allocates each resource in the set of resources available to the local device between at least a first wireless link and a second wireless link, wherein the first wireless link is between the requesting device and the local device and the second wireless link is between the local device and an access node.

51. The local device of claim 47, wherein the processing circuit is further configured to establish the wireless link by establishing an end-to-end wireless link through the local device and one or more intermediate devices based on resource information received for each intermediate device, the end-to-end wireless link selected from among multiple links based on the metric that relates increasing processing power resources to increasing link reliability.

52. The local device of claim 47, wherein the processing circuit is further configured to:
aggregate first and second routes between the requesting device and a destination device into an aggregated route; and
transmit information between the requesting device and the destination device along the first and second routes of the aggregated route.

53. The local device of claim 47, wherein the processing circuit is further configured to obtain the recursively-determined route category information based in part on multiple discovery queries flowing forward toward the destination device via multiple links between multiple intermediate devices.

54. The local device of claim 47, wherein the recursively-determined route category information comprises sponsored connectivity information.

55. The local device of claim 47, wherein the processing circuit is further configured to negotiate to alter an amount of resources already allocated to one or more links that are currently active on the local device to obtain a particular level of resources for an additional link to be established with the requesting device.

56. The local device of claim 47, wherein the processing circuit is further configured to pre-allocate resources before a link is established to ensure accommodation of a requested wireless link.

* * * * *